US009887426B2

(12) United States Patent
Heide

(10) Patent No.: US 9,887,426 B2
(45) Date of Patent: Feb. 6, 2018

(54) FUEL CELL

(71) Applicant: FRESENIUS MEDICAL CARE DEUTSCHLAND GMBH, Bad Homburg (DE)

(72) Inventor: Alexander Heide, Eppstein (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 126 days.

(21) Appl. No.: 15/023,590

(22) PCT Filed: Sep. 23, 2014

(86) PCT No.: PCT/EP2014/070190
§ 371 (c)(1),
(2) Date: Mar. 21, 2016

(87) PCT Pub. No.: WO2015/040233
PCT Pub. Date: Mar. 26, 2015

(65) Prior Publication Data
US 2016/0233526 A1    Aug. 11, 2016

(30) Foreign Application Priority Data

Sep. 23, 2013  (DE) .................. 10 2013 015 876

(51) Int. Cl.
*H01M 8/02* (2016.01)
*H01M 8/0247* (2016.01)
(Continued)

(52) U.S. Cl.
CPC ....... *H01M 8/0247* (2013.01); *H01M 4/8605* (2013.01); *H01M 4/92* (2013.01);
(Continued)

(58) Field of Classification Search
CPC .................................................... H01M 8/02
See application file for complete search history.

(56) References Cited

U.S. PATENT DOCUMENTS 3,228,797 A   1/1966  Brown et al.
7,150,932 B1  12/2006 Höfler et al.
(Continued)

FOREIGN PATENT DOCUMENTS

DE   199 09 930 A1   9/2000
JP   2007-194205 A    8/2007

OTHER PUBLICATIONS

International Preliminary Report on Patentability in PCT/EP2014/070190 dated Apr. 7, 2016.
(Continued)

*Primary Examiner* — Jacob Marks
(74) *Attorney, Agent, or Firm* — Kilyk & Bowersox, P.L.L.C.

(57) ABSTRACT

A fuel cell and a method for manufacturing a fuel cell from a hollow fiber membrane module. The fuel cell has a housing in which a bundle of hollow fiber membranes is arranged. The volume enclosed by the housing is subdivided into an inlet space, an intermediate space and an outlet space by a partition wall which tightly encloses one end-face portion of the bundle of hollow fiber membranes and a partition wall which tightly encloses the other end-face portion of the bundle of hollow fiber membranes. The inlet space is in a fluid connection with one open end of the hollow fiber membranes, while the outlet space is in a fluid connection with the other open end of the hollow fiber membranes. The fuel cell is distinguished by a simplified electrical connection of all of the electrical layers forming the anode and cathode. As a result, the fuel cell can be produced cost-effectively in large numbers. The conductive layers, forming the anode and cathode, on the inner and outer faces of the hollow fiber membranes are connected by coating the wall of the housing or the two partition walls, which delimit the
(Continued)

inlet space and outlet space as well as the intermediate space, with an electrically conductive material.

20 Claims, 2 Drawing Sheets

(51) Int. Cl.
| | |
|---|---|
| *H01M 8/1004* | (2016.01) |
| *H01M 8/241* | (2016.01) |
| *H01M 8/2475* | (2016.01) |
| *H01M 4/86* | (2006.01) |
| *H01M 4/92* | (2006.01) |
| *H01M 8/0271* | (2016.01) |
| *H01M 8/22* | (2006.01) |
| *H01M 8/1011* | (2016.01) |
| *H01M 8/00* | (2016.01) |
| *H01M 8/1018* | (2016.01) |

(52) U.S. Cl.
CPC ....... *H01M 8/0271* (2013.01); *H01M 8/1004* (2013.01); *H01M 8/227* (2013.01); *H01M 8/241* (2013.01); *H01M 8/2475* (2013.01); *H01M 4/8673* (2013.01); *H01M 8/004* (2013.01); *H01M 8/1011* (2013.01); *H01M 2008/1095* (2013.01); *Y02E 60/523* (2013.01); *Y02P 70/56* (2015.11)

(56) References Cited

U.S. PATENT DOCUMENTS

2003/0059665 A1\* 3/2003 Blum .................. B01J 19/0093
429/513
2011/0200912 A1 8/2011 Langry et al.

OTHER PUBLICATIONS

International Search Report from PCT/EP2014/070190, dated Jan. 21, 2015.

\* cited by examiner

FUEL CELL

CROSS REFERENCE TO RELATED APPLICATIONS

The present application is the national stage entry of International Patent Application No. PCT/EP2014/070190, filed on Sep. 23, 2014, the disclosure of which is expressly incorporated herein by reference in its entirety, and which claims priority to Application No. DE 10 2013 015 876.1, filed in the Federal Republic of Germany on Sep. 23, 2013.

FIELD OF INVENTION

The present invention relates to a fuel cell and to a method for manufacturing a fuel cell from a hollow fiber membrane module.

BACKGROUND

For generating electrical energy, fuel cells are known which convert chemical reaction energy from a continuously supplied fuel and an oxidant into electrical energy.

Various types of fuel cell are known. The best-known fuel cells are hydrogen and methanol fuel cells. In the direct methanol fuel cell (DMFC), which is distinguished by relatively low heat production, methanol is used as the fuel.

The fuel cell has two electrode plates, which are separated by a semipermeable membrane. One electrode plate forms an anode, whilst the other electrode plate forms a cathode. The anode and cathode are coated with a catalyst. At the anode-side catalyst, methanol is oxidized to form carbon dioxide, and at the cathode-side catalyst, oxygen is absorbed as an oxidant and reduced to form water. In the process, protons are transported through the semipermeable membrane and electrons are passed through a circuit, generating electrical energy.

Using a single fuel cell, only electrical voltages in a range of 1 to 1.2 V can be generated. Therefore, a plurality of individual cells are arranged in a stack. However, in relation to the size of the membrane surface, which is of decisive importance for proton transport and thus for the total power of the fuel cell, this construction is distinguished by relatively large dimensions and a relatively high weight.

DE 199 51 687 A1 discloses a fuel cell comprising a plurality of reaction chambers, which are separated by a polymer electrolyte membrane and in which electrical conductors of differing polarity are alternately arranged. In the fuel cell, the semipermeable membrane is formed from a bundle of membrane hollow fibers, electrical conductors of the same polarity being provided inside and outside the membrane hollow fibers in each case, and in each case being electrically interconnected to form a cathode and an anode.

DE 199 51 687 A1 proposes providing electrical conductors, consisting of thin foils or threads of a conductive material, inside and outside the hollow fiber membranes as the anode and cathode. All of the electrical conductors are interconnected so as to form a joint anode or cathode.

SUMMARY

An object of the invention is to manufacture a fuel cell of the aforementioned type, distinguished by a high power density and a compact construction along with a reduced weight, cost-effectively in a simple manner.

The fuel cell according to the present invention has a housing in which a bundle of hollow fiber membranes is arranged.

The volume enclosed by the housing is subdivided into an inlet space, an intermediate space and an outlet space, by a partition wall which tightly encloses one end-face portion of the bundle of hollow fiber membranes and a partition wall which tightly encloses the other end-face portion of the bundle of hollow fiber membranes. The inlet space is in a fluid connection with one open end of the hollow fiber membranes, whilst the outlet space is in a fluid connection with the other open end of the hollow fiber membranes.

The inner faces and the outer faces of the hollow fiber membranes comprise at least one layer including a catalyst material and an electrically conductive material. The inner faces of the hollow fiber membranes and the outer faces of the hollow fiber membranes may be coated with a layer of a catalyst material, and the layer of the catalyst material may be coated with a layer of an electrically conductive material. However, it is also possible for a material having both properties to be applied in a single layer. For example, a separate electrically conductive layer can be dispensed with if the catalyst material is itself conductive.

There is an inlet terminal at the inlet space and an outlet terminal at the outlet space, whilst an inlet terminal and an outlet terminal are provided at the intermediate space.

The inlet and outlet spaces are in a fluid connection via the hollow spaces of the hollow fibers, in such a way that a medium can flow from the inlet terminal through the hollow spaces of the hollow fibers to the outlet terminal. A medium which flows in via the inlet terminal of the intermediate space and flows out via the outlet terminal of the intermediate space can flow around the hollow fibers.

The fuel cell according to the present invention is distinguished by a simplified electrical connection of all of the electrical conductors forming the anode and cathode. As a result, the fuel cell can be produced cost-effectively in large numbers.

The coatings of electrically conductive material, which form the anode and cathode, on the inner and outer faces of the hollow fiber membranes are connected by coating the wall of the housing or the two partition walls, which delimit the inlet space and outlet space as well as the intermediate space, with an electrically conductive material.

For the electrical connections of the anode and cathode, electrical connection contacts are formed on the housing, and are electrically connected to the respective layer of electrically conductive material in the inlet and outlet spaces and the intermediate space. The electrical contacting can, for example, take place in a simple manner at the inlet and outlet terminals of the housing, which are coated with the electrically conductive material on the inner faces.

The layers of conductive material can be applied directly to the surfaces of the housing wall and the partition walls. For reasons of manufacture, however, it is advantageous for the layers of conductive material to be applied to a layer of catalyst material which is already present on the surfaces of the housing wall and the partition walls, although the layer of catalyst material outside the surfaces on the inner and outer faces of the hollow fiber membranes is not required for the operation of the fuel cell.

The method according to the present invention for manufacturing a fuel cell is distinguished by the fact that the electrical connection of the individual layers, which form the anode and cathode, on the inner and outer faces of the hollow fiber membranes is produced by applying a layer of a conductive material.

The two layers are advantageously applied in that initially a liquid containing a catalyst material and subsequently a liquid containing an electrically conductive material are pumped on the one hand through the first and second inlet space and the hollow fiber membranes, and on the other hand through the intermediate space.

A special aspect of the present invention is the use of a dialyser module as a hollow fiber module for manufacturing the fuel cell.

The dialyser modules used in medicine (dialysis) have a bundle of hollow fiber membranes, which are in principle suitable for a fuel cell. The present invention therefore proposes supplying the (used) dialysers for a new purpose of use.

Manufacturing fuel cells for dialyser hollow fiber membrane modules basically only requires a coating comprising a catalyst material and a coating comprising a conductive material or the application of a coating which acts equally as a catalyst and as a conductor. The housing comprising the terminals for supplying and removing the media are already present in the dialyser module.

A fuel cell of this type, manufactured from a dialyser module, has a compact construction along with a low weight, making the fuel cell universally useable.

Instead of the inner and outer faces of the hollow fiber membranes being coated with liquids containing material, bundles of hollow fiber membranes of which the hollow fibers already have at least one of the two material layers may be used. Multi-layer hollow fibers of this type may be manufactured in an extrusion method. However, in this case too, all of the conductors are electrically connected by a layer of a conductive material in the inlet or outlet space and the intermediate space, in which the respective ends of the hollow fiber membrane are in a fluid connection.

In a preferred embodiment of the present invention, the housing of the fuel cell is a cylindrical housing, the first and second partition walls being cylindrical bodies. This results in a compact and simple construction, in which the sealing of the partition wall against the housing wall is particularly simple. Preferably, the first and second partition wall consist of a sealing compound.

The catalyst material is preferably platinum or palladium. However, other catalyst materials may also be used. The layer thickness of the layer of the catalyst material is preferably between 2 nm and 500 nm. The diameter of the hollow fiber membranes is preferably between 50 μm and 500 μm.

The conductive material preferably contains carbon particles or carbon fibers. However, the conductive material may also contain other conductive particles or fibers. In principle, all conductive materials are conceivable, for example, metals or conductive polymers or ceramic materials.

If a dialyser module is used as the hollow fiber membrane module for manufacturing a fuel cell, the pores present in the hollow fiber membranes of the dialyser module are preferably filled with an ion-conducting material. This filling may use an adhesive wetted with polysulfone.

In the following, an embodiment of the present invention is described in greater detail with reference to the drawings.

DETAILED DESCRIPTION

Figure 1:
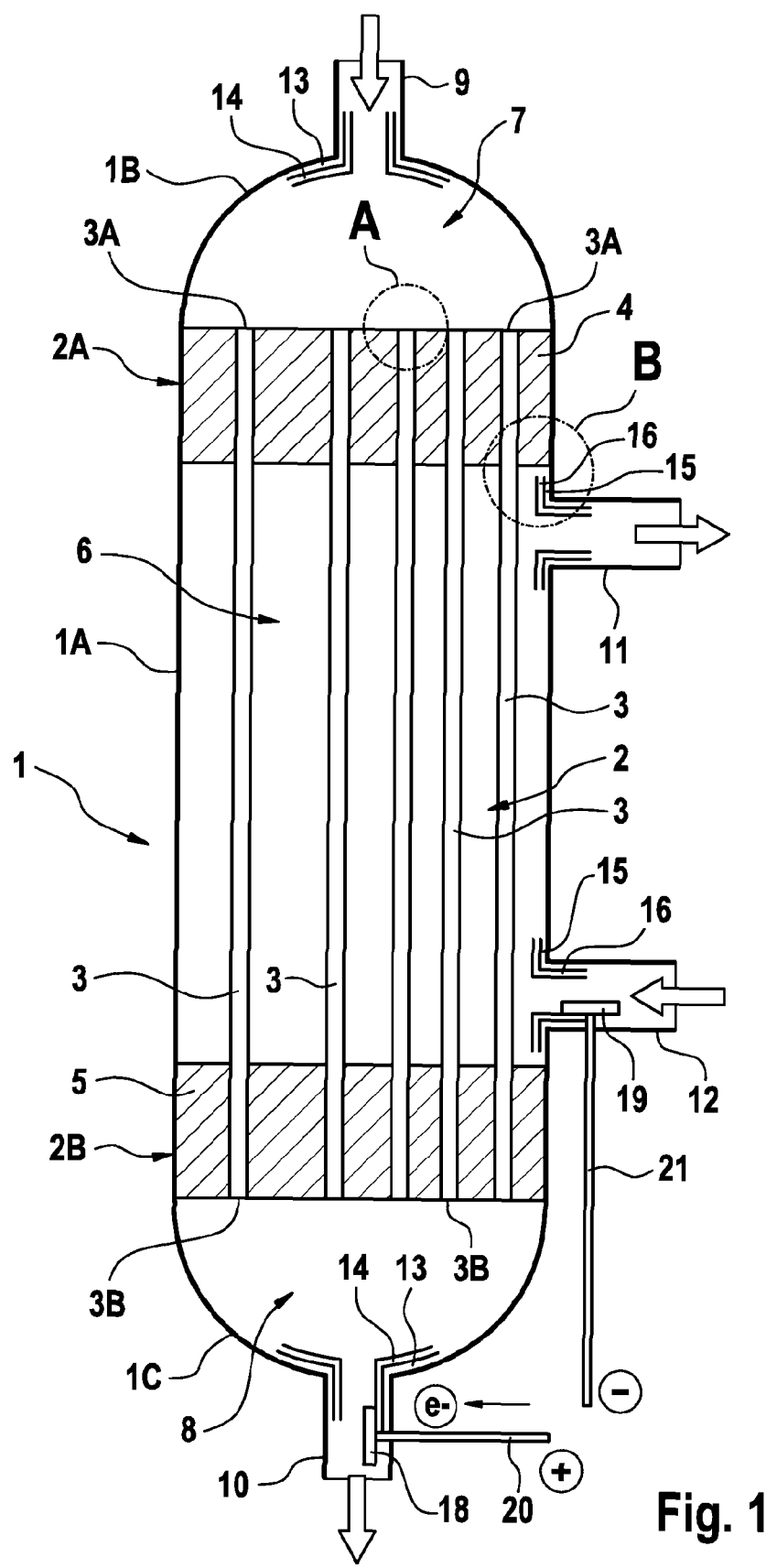
FIG. 1 is a simplified schematic drawing of an embodiment of the fuel cell according to the present invention.

The fuel cell according to the present invention can be manufactured from a dialyser module. FIG. 1 is a simplified schematic drawing of a fuel cell manufactured from a dialyser module.

In the following, the construction of the dialyser module is initially described. The dialyser module comprises an elongate housing 1 having a hollow cylindrical housing part 1A and two end pieces 1B and 1C, which tightly seal the hollow cylindrical housing part 1A at both ends.

A bundle 2 of hollow fiber membranes 3 is arranged in the hollow cylindrical part 1A of the housing 1. The hollow fiber membranes 3, which are each open at the ends, extend parallel to the longitudinal direction of the housing 1.

Among other things, the hollow fiber membranes may consist of polysulfones (PSU), polyimides (PI), poly(etheretherketones) (PEEK) or polyethersulfones (PES).

One end-face portion 2A of the bundle 2 of hollow fiber membranes 3 is tightly enclosed by a first plate-shaped partition wall 4, which is positioned tightly in one end piece 1B of the hollow cylindrical housing part 1A, whilst the other end-face portion 2B of the hollow fiber membrane bundle 2 is tightly enclosed by a second partition wall 5, which is positioned tightly in the other end piece 1C of the hollow cylindrical housing part 1A. The two partition walls 4 and 5 consist of a sealing compound, which is preferably polyurethane.

Between the two partition walls 4, 5 there is an intermediate space 6, through which the hollow fiber membranes 3 extend.

The wall of one end piece 1B of the housing 1, together with the outer face of the partition wall 4, delimits an inlet space 7, whilst the other end piece 1C of the housing, together with the outer face of the second partition wall 5, delimits an outlet space 8. The open ends 3A and 3B of the hollow fiber membranes 3 are in a flow connection via the inlet and outlet spaces respectively.

An inlet terminal 9 is provided at one end piece 1B of the housing 1 and an outlet terminal 10 is provided at the other end piece 1C. At the hollow cylindrical housing part 1A, there is an outlet terminal 11 alongside one partition wall 4 and an inlet terminal 12 alongside the other partition wall 5. When the fuel cell is operated in direct flow, and not in counter flow, the positions of the inlet and outlet terminals of the intermediate space are reversed.

The inner faces of the hollow fiber membranes 3 are coated with a layer 13 of a catalyst material. Platinum or palladium or alloys thereof may be used as catalyst materials. A layer 14 of a conductive material, which may contain carbon particles or carbon fibers (FIG. 2 and FIG. 3), is applied to the layer 13 of a catalyst material. However, a single layer which acts as a catalyst and a conductor may also be applied to the inner faces of the hollow fiber membranes 3.

Figure 2:
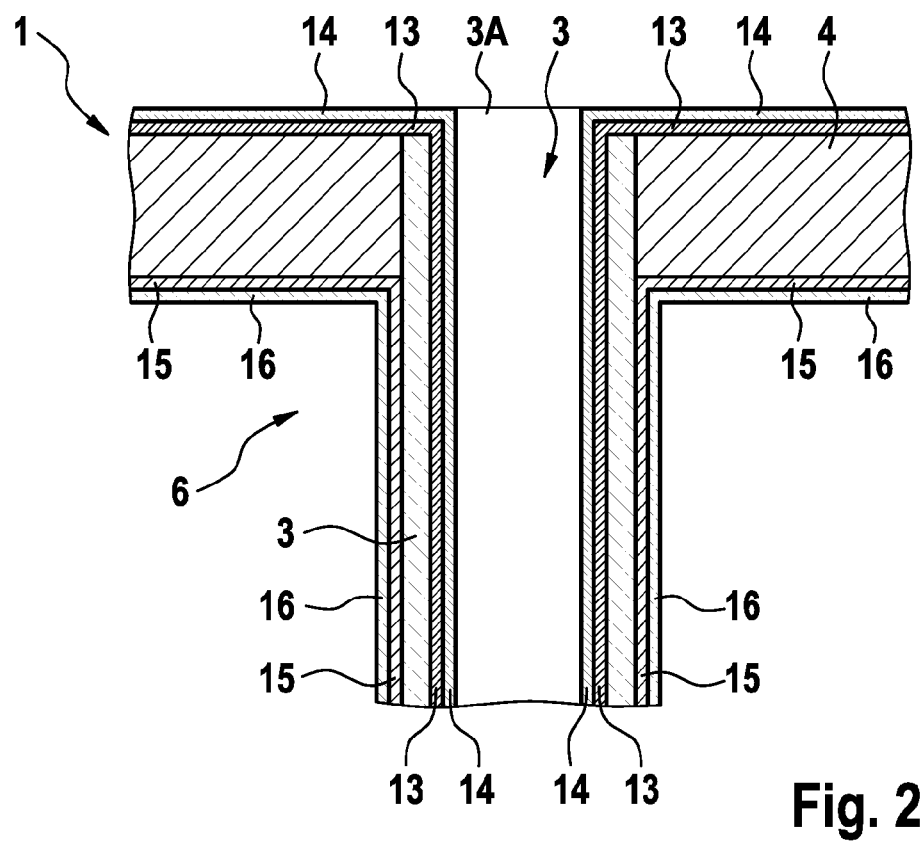
FIG. 2 is an enlarged drawing of the end-face portion of a hollow fiber membrane in the region of the portion A of the partition wall of the housing of the fuel cell from FIG. 1.
Figure 3:
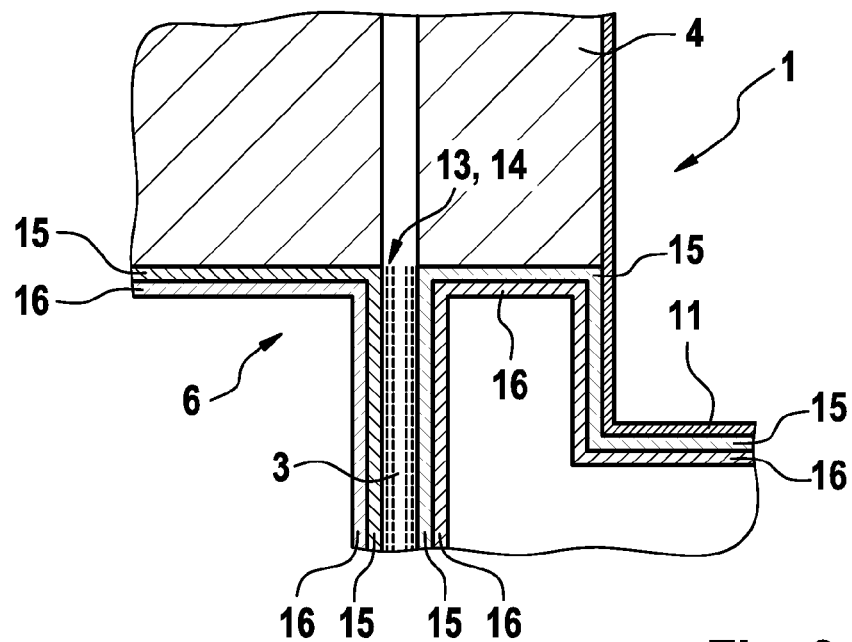
FIG. 3 is an enlarged drawing of the detail B from FIG. 1.

Likewise, a layer 15 of a catalyst material is applied to the outer faces of the hollow fiber membranes 3, and a layer 16 of a conductive material is applied to the layer of the catalyst material (FIG. 2 and FIG. 3). These two layers 15 and 16 extend not only along the outer face of the hollow fiber membranes, but over the entire wall of the hollow cylindrical housing part 1A and the inner faces of the two partition walls 4 and 5 which delimit the intermediate space 6. Preferably, the two layers 15, 16 also extend into the inlet and outlet terminals 11 and 12, which are formed as a one-piece part of the housing. However, a single layer which acts as a catalyst and a conductor may be applied to the outer face of the hollow fiber membranes 3.

The wall, which delimits the inlet space 7, of the first end piece 1B and the outer face of one partition wall 4 and the wall of the end piece 1C, which delimits the outlet space 8, and the outer face of the other partition wall 5 are likewise coated with a layer 14 of a conductive material. The layer 14 of conductive material may also be applied to a layer 13 of a catalyst material, with which the walls of the end pieces 1B and 1C and the outer faces of the partition walls 4 and 5 are coated. This may be advantageous for reasons of manufacture, as is explained further in the following. In this case too, just a single layer which can act both as a catalyst and as a conductor may be provided.

The electrically conductive layer 14 in the inlet and outlet space 7, 8 creates an electrical connection between the electrically conductive layers 14 on the inner face of the hollow fiber membranes 3, whilst the electrically conductive layer 16 in the intermediate space 6 creates an electrical connection between the electrically conductive layers 16 on the outside of the hollow fiber membranes 3.

The fuel cell comprises two electrical connection contacts 18 and 19, of which the first connection contact 18 is electrically connected to the layer of conductive material 14 in one of the two end pieces 7, 8 of the housing 1 and the second connection contact 19 is electrically connected to the layer 16 of conductive material in the hollow cylindrical housing part 1A. Electrical lines 20, 21 can be connected to the electrical connection contacts 18, 19 so as to be able to connect a load to the fuel cell. The electrical connection contacts 18 and 19 are merely shown schematically in FIG. 1.

In the fuel cell, the layer 16 on the outer face of the hollow fiber membranes 3 forms the anode and the layer 14 on the inner face of the hollow fiber membranes 3 forms the cathode. All of the fiber membranes are connected in parallel, resulting in a high power density.

If a conventional dialyser module is used for manufacturing the fuel cell, the layers of conductive material and catalyst material are not yet present.

Since the dialysers have hollow fiber membranes in which pores are provided, it is necessary to fill the pores of the hollow fibers with an ion-conducting material. The pores can be filled with an ion-conducting material by producing a sufficient trans-membrane pressure. The pores can be filled with an adhesive wetted with polysulfone.

For reasons of manufacture, it is advantageous for both a layer of a catalyst material and a layer of a conductive material to be applied to the wall of the end pieces 1B and 1C and to the adjacent inner faces of the partition walls 4, 5, although a layer of a catalyst material is not required in the inlet and outlet spaces 7, 8. A layer of a catalyst material is also not required on the inner faces of the partition walls 4 and 5 and the wall of the cylindrical housing part 1A.

In a first work step, a liquid containing a catalyst material is supplied at the inlet terminal 9 and removed at the outlet terminal 10, causing the inlet and outlet spaces 7, 8 and the inner faces of the hollow fiber membranes 3 to be coated. In a second work step, a liquid containing a conductive material is pumped through the inlet space 7, the hollow fiber membranes 3 and the outlet space 8, in such a way that a layer 14 of a conductive material is applied to the layer 13 of a catalyst material.

The two layers 15, 16 of catalyst material and conductive material are also applied in the intermediate space 6, in which a liquid containing a catalyst material or a liquid containing a conductive material is supplied via the inlet terminal 12 and removed via the outlet terminal 11.

The known dialysers generally have a membrane surface area of approximately 1.5 m$^2$. Using a membrane surface area of this type, it is possible to produce a fuel cell which has a power of between 100 and 150 Watt at an assumed efficiency of just 10%, whilst in practice the efficiency should be higher.

To generate electrical energy, a methanol/water mixture is supplied to the fuel cell via the inlet terminal 12. The carbon dioxide produced in the fuel cell is removed via the outlet terminal 11. Air is supplied to the fuel cell via the inlet terminal 9. The water formed from the protons and electrons using the oxygen from the air is removed via the outlet terminal 10. However, it is also possible to swap the flow paths, in which case the combustion air is not passed through the hollow fiber membranes.

The chemical reaction in the fuel cell is described by the following equations.

Anode      $CH_3OH + H_2O \rightarrow 6\ H^+ + 6\ e^- + CO_2$

Oxidation/electron loss

Cathode      $3\ O_2 + 12\ H^+ + 12\ e^{-1} \rightarrow 6\ H_2O$

Reduction/electron gain

Overall reaction      $2\ CH_3OH + 3\ O_2 \rightarrow 4\ H_2O + 2\ CO_2$

Redox reaction/cell reaction

The invention claimed is:

1. A fuel cell comprising:
a housing in which a bundle of hollow fiber membranes is arranged;
a first partition wall that tightly encloses a first end-face portion of the bundle of hollow fiber membranes;
a second partition wall that tightly encloses a second end-face portion of the bundle of hollow fiber membranes;
wherein the first partition wall and the second partition wall divide the housing into an inlet space, which is in a fluid connection with an open end of the hollow fiber membranes, an outlet space, which is in a fluid connection with the other open end of the hollow fiber membranes, and an intermediate space, which is positioned between the first and second partition walls;
a first inlet terminal at the inlet space, and a first outlet terminal at the outlet space; and
a second inlet terminal at the intermediate space, and a second outlet terminal at the intermediate space;
wherein:
the inner faces of the hollow fiber membranes and the outer faces of the hollow fiber membranes comprise at least one layer comprising a catalyst material and an electrically conductive material;
a first layer of an electrically conductive material is applied to a wall of the housing delimiting the inlet space, a surface of the first partition wall delimiting the inlet space, a wall of the housing delimiting the outlet space, and a surface of the second partition wall delimiting the outlet space;

a second layer of an electrically conductive material is applied to a wall of the housing delimiting the intermediate space, a surface of the first partition wall delimiting the intermediate space, and a surface of the second partition wall delimiting the intermediate space;

a first electrical connection contact, that is electrically connected to the first layer of electrically conductive material, is formed on the housing; and a second electrical connection contact, that is electrically connected to the second layer of electrically conductive material, is formed on the housing.

2. The fuel cell according to claim 1, wherein a layer of a catalyst material is provided under the first layer of electrically conductive material and under the second layer of electrically conductive material.

3. The fuel cell according to claim 1, wherein the housing is a cylindrical housing, the first partition wall is a first cylindrical body, and the second partition wall is a second cylindrical body.

4. The fuel cell according to claim 1, wherein the first and second partition walls consist of a sealing compound.

5. The fuel cell according to claim 1, wherein the catalyst material is platinum or palladium.

6. The fuel cell according to claim 2, wherein the catalyst material is platinum or palladium.

7. The fuel cell according to claim 2, wherein the thickness of the layer of the catalyst material is between 2 nm and 500 nm.

8. The fuel cell according to claim 1, wherein the first layer of electrically conductive material and the second layer of electrically conductive material each contain carbon particles or carbon fibers.

9. The fuel cell according to claim 1, wherein the hollow fiber membranes have a diameter of between 50 μm and 500 μm.

10. The fuel cell according to claim 2, wherein the hollow fiber membranes have a diameter of between 50 μm and 500 μm.

11. A method of manufacturing a fuel cell from a hollow fiber membrane module, the hollow fiber membrane module comprising:

a housing in which a bundle of hollow fiber membranes is arranged;

a first partition wall that tightly encloses a first end-face portion of the bundle of hollow fiber membranes;

a second partition wall that tightly encloses a second end-face portion of the bundle of hollow fiber membranes;

wherein the first partition wall and the second partition wall divide the housing into an inlet space, which is in a fluid connection with an open end of the hollow fiber membranes, an outlet space, which is in a fluid connection with the other open end of the hollow fiber membranes, and an intermediate space, which is positioned between the first and second partition walls;

a first inlet terminal at the inlet space, and a first outlet terminal at the outlet space; and a second inlet terminal at the intermediate space, and a second outlet terminal at the intermediate space;

the method comprising:

coating the inner faces of the hollow fiber membranes and the outer faces of the hollow fiber membranes with at least one layer comprising a catalyst material and an electrically conductive material;

applying a first layer of an electrically conductive material to a wall of the housing delimiting the inlet space, a surface of the first partition wall delimiting the inlet space, a wall of the housing delimiting the outlet space, and a surface of the second partition wall delimiting the outlet space;

applying a second layer of an electrically conductive material to a wall of the housing delimiting the intermediate space, a surface of the first partition wall delimiting the intermediate space, and a surface of the second partition wall delimiting the intermediate space;

forming a first electrical connection contact, that is electrically connected to the first layer of electrically conductive material, on the housing; and forming a second electrical connection contact, that is electrically connected to the second layer of electrically conductive material, on the housing.

12. The method according to claim 11, further comprising:

in a first step, pumping a first liquid containing a catalyst material through the inlet space, the outlet space and the hollow fiber membranes, and pumping a second liquid containing a catalyst material through the intermediate space; and in a second step, pumping a first liquid containing an electrically conductive material through the inlet space, the outlet space and the hollow fiber membranes, and pumping a second liquid containing an electrically conductive material through the intermediate space.

13. The method according to claim 11, wherein the catalyst material is platinum or palladium.

14. The method according to claim 12, wherein the catalyst material is platinum or palladium.

15. The method according to claim 11, wherein the catalyst material is applied at a layer thickness of between 2 nm and 500 nm.

16. The method according to claim 11, wherein the first layer of electrically conductive material and the second layer of electrically conductive material each contain carbon particles or carbon fibers.

17. The method according to claim 11, wherein the hollow fiber membranes have a diameter of between 50 μm and 500 μm.

18. The method according to claim 11, wherein the hollow fiber membrane module is a dialyser module.

19. The method according to claim 12, wherein the hollow fiber membrane module is a dialyser module.

20. The method according to claim 18, wherein the pores of the hollow fiber membranes are filled with an ion-conducting material.

* * * * *